US012289213B2

(12) United States Patent
Cao et al.

(10) Patent No.: US 12,289,213 B2
(45) Date of Patent: Apr. 29, 2025

(54) DATA SYNCHRONIZATION METHOD AND APPARATUS, AND DEVICE AND STORAGE MEDIUM

(71) Applicant: IEIT SYSTEMS CO., LTD., Shandong (CN)

(72) Inventors: Fang Cao, Shandong (CN); Zhenhua Guo, Shandong (CN); Li Wang, Shandong (CN); Kai Gao, Shandong (CN); Yaqian Zhao, Shandong (CN); Rengang Li, Shandong (CN)

(73) Assignee: IEIT SYSTEMS CO., LTD., Shandong (CN)

( * ) Notice: Subject to any disclaimer, the term of this patent is extended or adjusted under 35 U.S.C. 154(b) by 0 days.

(21) Appl. No.: 18/721,620

(22) PCT Filed: Nov. 15, 2022

(86) PCT No.: PCT/CN2022/132053
§ 371 (c)(1),
(2) Date: Jun. 18, 2024

(87) PCT Pub. No.: WO2023/207035
PCT Pub. Date: Nov. 2, 2023

(65) Prior Publication Data
US 2024/0422067 A1 Dec. 19, 2024

(30) Foreign Application Priority Data

Apr. 29, 2022 (CN) .......................... 202210468218.4

(51) Int. Cl.
*H04L 41/12* (2022.01)
*G06F 13/40* (2006.01)
(Continued)

(52) U.S. Cl.
CPC .......... *H04L 41/12* (2013.01); *G06F 13/4009* (2013.01); *G06F 13/4221* (2013.01); *G11B 27/10* (2013.01); *G06F 2213/0026* (2013.01)

(58) Field of Classification Search
CPC .............................. G06F 9/5011; G06N 3/084
See application file for complete search history.

(56) References Cited

U.S. PATENT DOCUMENTS

2017/0171019 A1* 6/2017 Nayak ................... G06F 16/122
2018/0357534 A1* 12/2018 Cho ........................ G06N 3/084
(Continued)

FOREIGN PATENT DOCUMENTS

| CN | 110908799 A | 3/2020 |
| CN | 111105016 A | 5/2020 |

(Continued)

OTHER PUBLICATIONS

Zhu Hu-Ming, et al. "Review of Parallel Deep Neural Network." Chinese Journal of Computers 41(8): 1861-1881. Jan. 3, 2018.
(Continued)

*Primary Examiner* — Getente A Yimer
(74) *Attorney, Agent, or Firm* — IPro, PLLC

(57) ABSTRACT

A data synchronization method and apparatus, and a device and a storage medium are disclosed. The method comprises: constructing first-level physical topologies between acceleration devices of the same type, and constructing second-level physical topologies between acceleration devices of different types, the acceleration devices in the second-level physical topology are connected by using a cache coherence protocol; performing first processing on to-be-synchronized data among the acceleration devices through scatter reduce communication based on the first-level physical topologies, and performing second processing on data after the first processing among the acceleration devices through scatter (Continued)

reduce communication based on the second-level physical topologies; and performing third processing on data after the second processing among the acceleration devices through all gather communication based on the second-level physical topologies, and performing fourth processing on data after the third processing among the acceleration devices through all gather communication based on the first-level physical topologies.

16 Claims, 5 Drawing Sheets

(51) Int. Cl.
*G06F 13/42* (2006.01)
*G06N 3/08* (2023.01)
*G11B 27/10* (2006.01)
*H04L 49/90* (2022.01)

(56) References Cited

U.S. PATENT DOCUMENTS

| | | | | |
|---|---|---|---|---|
| 2019/0034102 | A1* | 1/2019 | Miller | H04L 69/12 |
| 2019/0109783 | A1* | 4/2019 | Kommula | H04L 49/25 |
| 2019/0149467 | A1* | 5/2019 | Gouache | H04L 45/30 |
| | | | | 709/245 |
| 2019/0227845 | A1* | 7/2019 | Sridhar | G06F 9/5044 |
| 2019/0312772 | A1* | 10/2019 | Zhao | G06F 9/5011 |
| 2019/0332422 | A1* | 10/2019 | Liu | G06F 9/4881 |
| 2020/0160112 | A1* | 5/2020 | Dennison | G06N 3/084 |

FOREIGN PATENT DOCUMENTS

| | | |
|---|---|---|
| CN | 111597139 A | 8/2020 |
| CN | 113568860 A | 10/2021 |
| CN | 114050975 A | 2/2022 |
| CN | 114202027 A | 3/2022 |
| CN | 114281521 A | 4/2022 |
| CN | 114884908 A | 8/2022 |

OTHER PUBLICATIONS

Campos, Victor, et al. "Distributed training strategies for a computer vision deep learning algorithm on a distributed GPU cluster." Procedia Computer Science 108 (2017): 315-324.

* cited by examiner

DATA SYNCHRONIZATION METHOD AND APPARATUS, AND DEVICE AND STORAGE MEDIUM

CROSS REFERENCE TO RELATED APPLICATION

The present application claims the priority of the Chinese patent application 202210468218.4 titled "DATA SYNCHRONIZATION METHOD AND APPARATUS. AND DEVICE AND STORAGE MEDIUM" and filed in China National Intellectual Property Administration on Apr. 29, 2022, which is incorporated herein by reference in their entirety.

TECHNICAL FIELD

The present application relates to the technical field of model training, and in particular to a data synchronization method, an apparatus, a device, and a storage medium.

BACKGROUND

As deep neural networks are widely used, their model sizes become larger and larger. The growth makes efficient model training more important, and distributed training emerges. At present, there are two methods for training the distributed models: data parallelism and model parallelism. The most commonly used and widely used is the data parallelism method. The data parallelism method divides input data to be trained and trains multiple batches of data simultaneously on multiple acceleration devices during each training iteration. The data parallelism may be divided into two methods: synchronous data parallelism and asynchronous data parallelism. In the synchronous data parallelism method, after all acceleration devices compute gradients of the batches of data, multiple gradients are integrated together to update shared model parameters. This method may reduce the obsolescence of weights used to compute the gradients, so that the model may finally achieve a high convergence accuracy with good statistical efficiency, and is therefore widely used. In the distributed algorithm of synchronous data parallelism. Allreduce collective communication operator plays an important role. Allreduce is a collective communication operator whose goal is to integrate data from different computing nodes and distribute results to each node, so that each computing node has the integrated data.

At present, devices used in the synchronous data parallel training are required to be of the same type, such as all graphics processing unit (GPU) devices or all field programmable gate array (FPGA) devices. One of the main reasons for using devices of the same type is that the Allreduce process requires communication and data exchange between devices, and communication between devices of the same type usually has high bandwidth and low latency, while communication between heterogeneous devices usually comes at a high cost. For example GPU devices can communicate with each other at high speed through NVLink (NVIDIA Link, a bus and its communication protocol developed and launched by NVIDIA), but communication between GPUs and FPGAs often requires CPU as an intermediate medium for transmission, resulting in low efficiency. In this way, if various heterogeneous devices are forcibly placed in the same cluster for unified synchronous data parallel training, the efficiency will inevitably be very low. However, in modern data centers, acceleration devices such as GPUs and FPGAs are widely deployed. If only one type of devices may be used for each data parallel training, it will inevitably result in idle and wasted resources.

SUMMARY

In view of this, an objective of the present application is to provide a data synchronization method, an apparatus, a device, and a storage medium, which may achieve deep learning data parallelism based on multiple heterogeneous acceleration devices, and improve hardware resource utilization and data communication efficiency. The solution is as follows.

A first aspect of the present application provides a data synchronization method, including:

constructing first-level physical topologies of ring structures having a quantity consistent with a quantity of types of acceleration devices among acceleration devices of a same type in a target server, and constructing second-level physical topologies of ring structures having a quantity consistent with a quantity of acceleration devices of the same type among different types of acceleration devices in the target server, wherein different types of acceleration devices supporting cache coherence protocol are provided in the target server, quantities of acceleration devices of different types are the same and at least two, and acceleration devices in the second-level physical topologies are connected through the cache coherence protocol;

performing a first processing on to-be-synchronized data related to model training in acceleration devices of the same type through scatter_reduce communication based on the first-level physical topologies, and performing a second processing on data after the first processing in different types of acceleration devices through scatter_reduce communication based on the second-level physical topologies; and performing a third processing on data after the second processing in different types of acceleration devices through all_gather communication based on the second-level physical topologies, and performing a fourth processing on data after the third processing in acceleration devices of the same type through all_gather communication based on the first-level physical topologies.

In embodiments of the present application, acceleration devices corresponding to each of the first-level physical topologies are independent of each other, and acceleration devices corresponding to different first-level physical topologies perform concurrently when the first processing and the fourth processing are performed:

acceleration devices corresponding to each of the second-level physical topologies are independent of each other, and acceleration devices corresponding to different second-level physical topologies perform concurrently when the second processing and the third processing are performed.

In embodiments of the present application, the data synchronization method further includes:

constructing third-level physical topologies of ring structures having a quantity consistent with the quantity of acceleration devices of the same type in each target server among acceleration devices of the same type in different target servers when a plurality of target servers are provided, wherein each of the third-level physical topologies includes acceleration devices with a quantity the same as the target servers and located in different target servers;

after the performing the second processing on data after the first processing in different types of acceleration devices through scatter_reduce communication based on the second-level physical topologies, the method further includes;

performing a reduce operation on data after the second processing in acceleration devices in different target servers based on the third-level physical topologies and broadcasting the reduced data to each acceleration device, to determine the broadcasted data as data after the second processing in each acceleration device.

In embodiments of the present application, the performing the reduce operation on data after the second processing in acceleration devices in different target servers based on the third-level physical topologies and broadcasting the reduced data to each acceleration device, includes:

receiving data after the second processing in acceleration devices in different target servers by using a programmable switch, performing a reduce operation on the received data based on the third-level physical topologies, and broadcasting the reduced data to each acceleration device by using the programmable switch, wherein each target server is connected to one programmable switch.

In embodiments of the present application, the constructing the first-level physical topologies of ring structures having a quantity consistent with the quantity of types of acceleration devices among acceleration devices of the same type in the target server, and constructing second-level physical topologies of ring structures having a quantity consistent with the quantity of acceleration devices of the same type among different types of acceleration devices in the target server, includes:

constructing the first-level physical topologies corresponding to each target server among acceleration devices of the same type in each target server, and constructing the second-level physical topologies corresponding to each target server among different types of acceleration devices in each target server; and the performing the third processing on data after the second processing in different types of acceleration devices through all_gather communication based on the second-level physical topologies, and performing the fourth processing on data after the third processing in acceleration devices of the same type through all_gather communication based on the first-level physical topologies, includes;

performing the third processing on data after the second processing in different types of acceleration devices in each target server through all_gather communication based on the second-level physical topologies corresponding to each target server, and performing the fourth processing on data after the third processing in acceleration devices of the same type in each target server through all_gather communication based on the first-level physical topologies corresponding to each target server.

In embodiments of the present application, acceleration devices corresponding to each of the third-level physical topologies are independent of each other, and acceleration devices corresponding to different third-level physical topologies perform concurrently when the reduce operation is performed.

In embodiments of the present application, before the constructing the physical topologies among acceleration devices of the same type, the method further includes:

determining whether a bandwidth of data transmission between acceleration devices of the same type through other available connections is higher than a bandwidth of data transmission through the connection using the cache coherence protocol; and constructing the physical topologies among acceleration devices of the same type through the other available connections when the bandwidth of data transmission between acceleration devices of the same type through the other available connections is higher than the bandwidth of data transmission through the connection using the cache coherence protocol.

A second aspect of the present application provides a data synchronization apparatus, including:

a topology construction module for constructing first-level physical topologies of ring structures having a quantity consistent with a quantity of types of acceleration devices among acceleration devices of a same type in a target server, and constructing second-level physical topologies of ring structures having a quantity consistent with a quantity of acceleration devices of the same type among different types of acceleration devices in the target server, where different types of acceleration devices supporting cache coherence protocol are provided in the target server, quantities of acceleration devices of different types are the same and at least two, and acceleration devices in the second-level physical topologies are connected through the cache coherence protocol;

a first synchronization module for performing a first processing on to-be-synchronized data related to model training in acceleration devices of the same type through scatter_reduce communication based on the first-level physical topologies, and performing a second processing on data after the first processing in different types of acceleration devices through scatter_reduce communication based on the second-level physical topologies; and a second synchronization module for performing a third processing on data after the second processing in different types of acceleration devices through all_gather communication based on the second-level physical topologies, and performing a fourth processing on data after the third processing in acceleration devices of the same type through all_gather communication based on the first-level physical topologies.

A third aspect of the present application provides an electronic device including a processor and a memory, the memory is configured for storing a computer program, and the computer program implements the above data synchronization method when loaded and executed by the processor.

A fourth aspect of the present application provides a non-transitory computer-readable storage medium for storing a computer executable instruction, and the computer executable instruction implements the above data synchronization method when loaded and executed by a processor.

In the present application, first-level physical topologies of ring structures having a quantity consistent with the quantity of types of acceleration devices are constructed among acceleration devices of the same type in the target server, and then second-level physical topologies of ring structures having a quantity consistent with the quantity of acceleration devices of the same type are constructed among different types of acceleration devices. Different types of acceleration devices supporting the cache coherence protocol are provided in the target server. Quantities of acceleration devices of different types are the same and at least two. Acceleration devices in the second-level physical topologies are connected through the cache coherence protocol. The first processing is performed on the to-be-synchronized data in acceleration devices of the same type through scatter_reduce communication based on the first-level physical topologies. The second processing is performed on data after the first processing in different types of acceleration devices through scatter_reduce communication based on the second-level physical topologies. Finally, the third processing is performed on data after the second processing in different types of acceleration devices through all_gather communication based on the second-level physical topologies, and the fourth processing is performed on data after the third processing in acceleration devices of the same type through all_gather communication based on the first-level physical topologies. As can be seen, the physical topologies are constructed based on the cache coherence protocol connection among different types of acceleration devices, and scatter_reduce communication and all_gather communication are performed based on the physical topologies constructed among acceleration devices of the same type. Data of different types of acceleration devices, i.e., heterogeneous acceleration devices, may be synchronized, and deep learning data parallelism is achieved based on multiple heterogeneous acceleration devices. The utilization of hardware resources is improved, and the data communication during the parallel training of deep learning synchronous data is more efficient.

BRIEF DESCRIPTION OF THE DRAWINGS

The figures here are incorporated into and form a part of the specification, show embodiments consistent with the present application, and are used together with the specification to explain the principles of the present application.

In order to more clearly illustrate the technical solutions of the embodiments of the present disclosure or the prior art, the figures that are required to describe the embodiments or the prior art may be briefly introduced below. Apparently, the figures that are described below are embodiments of the present disclosure, and a person skilled in the art may obtain other figures according to these figures without paying creative work.

DEEMPENNAGEED DESCRIPTION OF THE EMBODIMENTS

The technical solutions of the embodiments of the present application may be clearly and completely described below with reference to the drawings of the embodiments of the present application. Apparently, the described embodiments are merely certain embodiments of the present application, rather than all of the embodiments. All of the other embodiments that a person skilled in the art obtains on the basis of the embodiments of the present application without paying creative work fall within the protection scope of the present application.

In the conventional technology, communication between devices of the same type usually has the advantages of high bandwidth and low latency, while communication between heterogeneous devices usually comes a high cost. Therefore, the devices used in the synchronous data parallel training are all required to be of the same type. If various heterogeneous devices are forcibly placed in the same cluster for unified synchronous data parallel training, the efficiency will inevitably be very low. For the above technical defects, the present application provides a data synchronization solution that may achieve deep learning data parallelism based on multiple heterogeneous acceleration devices, and improve hardware resource utilization and data communication efficiency.

Figure 1:
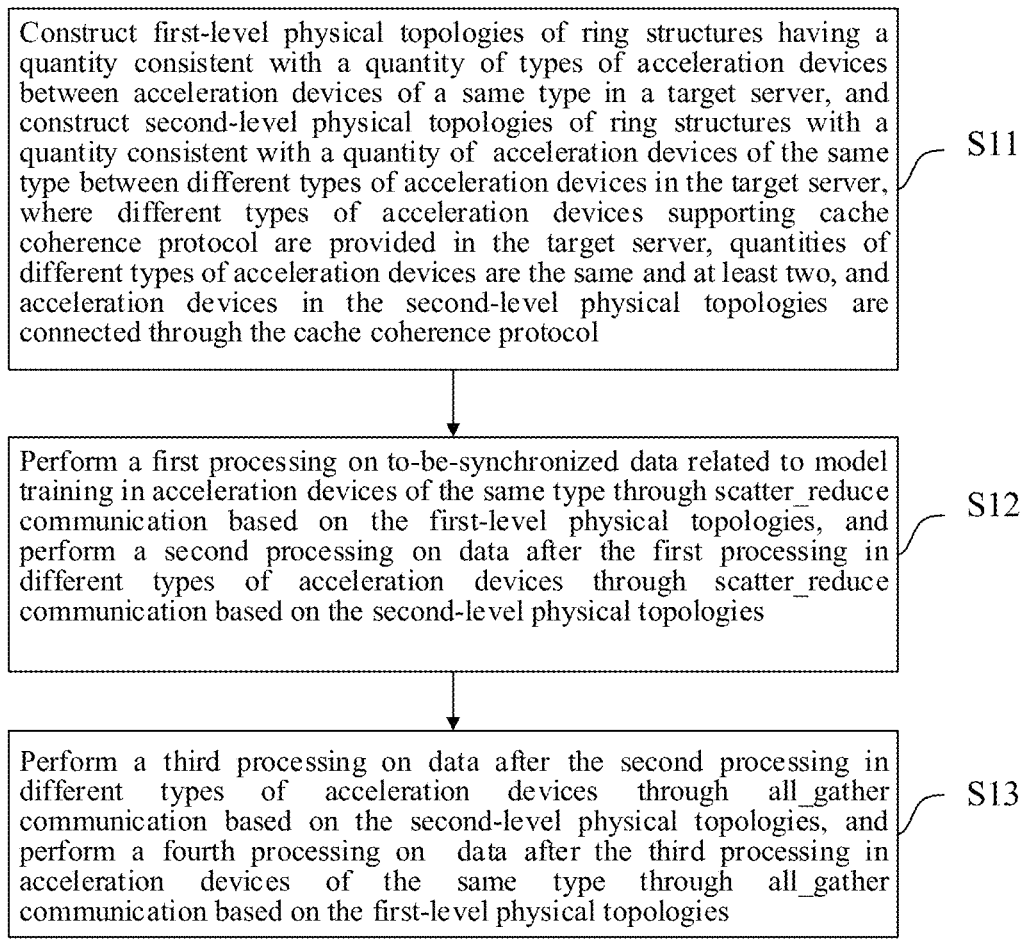
FIG. 1 is a flowchart of a data synchronization method provided in the present application.

FIG. 1 is a flowchart of a data synchronization method provided in an embodiment of the present application. As shown in FIG. 1, the data synchronization method includes S11-S13.

In S11, first-level physical topologies of ring structures having a quantity consistent with a quantity of types of acceleration devices are constructed among acceleration devices of a same type in a target server, and second-level physical topologies of ring structures having a quantity consistent with a quantity of acceleration devices of the same type are constructed among different types of acceleration devices in the target server: where different types of acceleration devices supporting cache coherence protocol are provided in the target server, quantities of acceleration devices of different types are the same and at least two, and acceleration devices in the second-level physical topologies are connected through the cache coherence protocol.

In the embodiment, the target server and acceleration devices carried therein are first constrained. The target server is provided with different types of acceleration devices supporting the cache coherence protocol. The acceleration devices include but are not limited to GPUs and FPGAs. The quantities of acceleration devices of different types are the same and at least two. Under the cache coherence protocol, acceleration devices may also be referred to as compute express link (CXL) devices. CXL is an open industry standard proposed by Intel for high bandwidth and low-latency device interconnection. It may be used to connect devices such as a CPU and an accelerator, a memory buffer and a smart NIC, etc. CXL solves the problem of inefficient communication between heterogeneous devices and makes it possible to deep learning data parallel training based on multiple heterogeneous devices.

In the embodiment, there are two physical connections between the heterogeneous devices. i.e., a connection through CPU as an intermediate medium and a connection through the cache coherence protocol. Since acceleration devices in the target server support the cache coherence protocol, and a bandwidth of data transmission through the cache coherence protocol is significantly higher a bandwidth of data transmission with the CPU as an intermediate medium, the CXL connection is selected here. A CXL device is selected from different types of devices in the same server node in turn, and these heterogeneous devices are connected through the CXL connection. That is, the heterogeneous devices are connected through the cache coherence protocol. i.e., various acceleration devices in the second-level physical topologies are connected through the cache coherence protocol.

It should be noted that although CXL devices of the same type may also be connected through the CXL connection, the bandwidth of data transmission through CXL connection is not always optimal. Therefore, when first-level physical topologies are constructed, it is necessary to first determine whether the bandwidth of data transmission between acceleration devices of the same type through other available connections is higher than the bandwidth of data transmission through the cache coherence protocol connection. If the bandwidth of data transmission between acceleration devices of the same type through other available connections is higher than the bandwidth of data transmission through the cache coherence protocol connection, physical topologies are constructed among acceleration devices of the same type through other available connections. Other available connections may be the original connections. By comparing the CXL bandwidth between the devices of the same type and the bandwidth of the original connections, a connection with optimal bandwidth is selected, and acceleration devices of the same type in the same target server are connected in pairs by this optimal connection. For example, if the bandwidth of data transmission between GPU devices through NVLink connection is better than the bandwidth of data transmission through CXL connection. NVLink connection is selected for the topologies.

In S12, a first processing is performed on to-be-synchronized data related to model training in acceleration devices of the same type through scatter_reduce communication based on the first-level physical topologies, and a second processing is performed on data after the first processing in different types of acceleration devices through scatter_reduce communication based on the second-level physical topologies.

In S13, a third processing is performed on data after the second processing in different types of acceleration devices through all_gather communication based on the second-level physical topologies, and a fourth processing is performed on data after the third processing in acceleration devices of the same type through all_gather communication based on the first-level physical topologies.

In the embodiment, as the AllReduce aggregation operation includes a scatter_reduce stage and an all_gather stage. The execution logic for each stage is consistent with the execution logic in the conventional technology, which are not repeated herein. The difference is that the execution of the embodiment is based on the constructed first-level physical topologies and the third-level physical topologies. The first processing is performed on the to-be-synchronized data related to model training in acceleration devices of the same type through scatter_reduce communication based on the first-level physical topologies, and the second processing is performed on data after the first processing in different types of acceleration devices through scatter_reduce communication based on the second-level physical topologies. Then, the third processing is performed on data after the second processing in different types of acceleration devices via all_gather communication based on the second-level physical topologies, and the fourth processing is performed on data after the third processing in acceleration devices of the same type through all_gather communication based on the first-level physical topologies. Therefore, each acceleration device on the target server has a complete global data aggregation result.

It may be understood that the acceleration devices corresponding to each of the first-level physical topologies in the embodiment are independent of each other. Acceleration devices corresponding to different first-level physical topologies concurrently perform the first processing and the fourth processing. Acceleration devices corresponding to each of the second-level physical topologies are independent of each other. Acceleration devices corresponding to different second-level physical topologies concurrently perform the second processing and the third processing.

As can be seen, in the embodiments of the present application, first-level physical topologies of ring structures having a quantity consistent with a quantity of types of acceleration devices are constructed among acceleration devices of the same type in the target server, and then second-level physical topologies of ring structures having a quantity consistent with a quantity of acceleration devices of the same type are constructed among different types of acceleration devices. Different types of acceleration devices supporting the cache coherence protocol are provided in the target server. The quantities of acceleration devices of different types are the same and at least two. Acceleration devices in the second-level physical topologies are connected through the cache coherence protocol. The first processing is performed on the to-be-synchronized data in acceleration devices of the same type through scatter_reduce communication based on the first-level physical topologies. The second processing is performed on data after the first processing in different types of acceleration devices through scatter_reduce communication based on the second-level physical topologies. Finally, the third processing is performed on data after the second processing in different types of acceleration devices through all_gather communication based on the second-level physical topologies, and the fourth processing is performed on data after the third processing in acceleration devices of the same type through all_gather communication based on the first-level physical topologies. In the embodiments of the present application, the physical topologies are constructed based on the cache coherence protocol connection among different types of acceleration devices, and scatter_reduce communication and all_gather communication are performed based on the physical topologies constructed among acceleration devices of the same type. Data of different types of acceleration devices. i.e., heterogeneous acceleration devices, may be synchronized and deep learning data parallelism is achieved based on multiple heterogeneous acceleration devices. The utilization of hardware resources is improved, and the data communication during the parallel training of deep learning synchronous data is more efficient.

Figure 2:
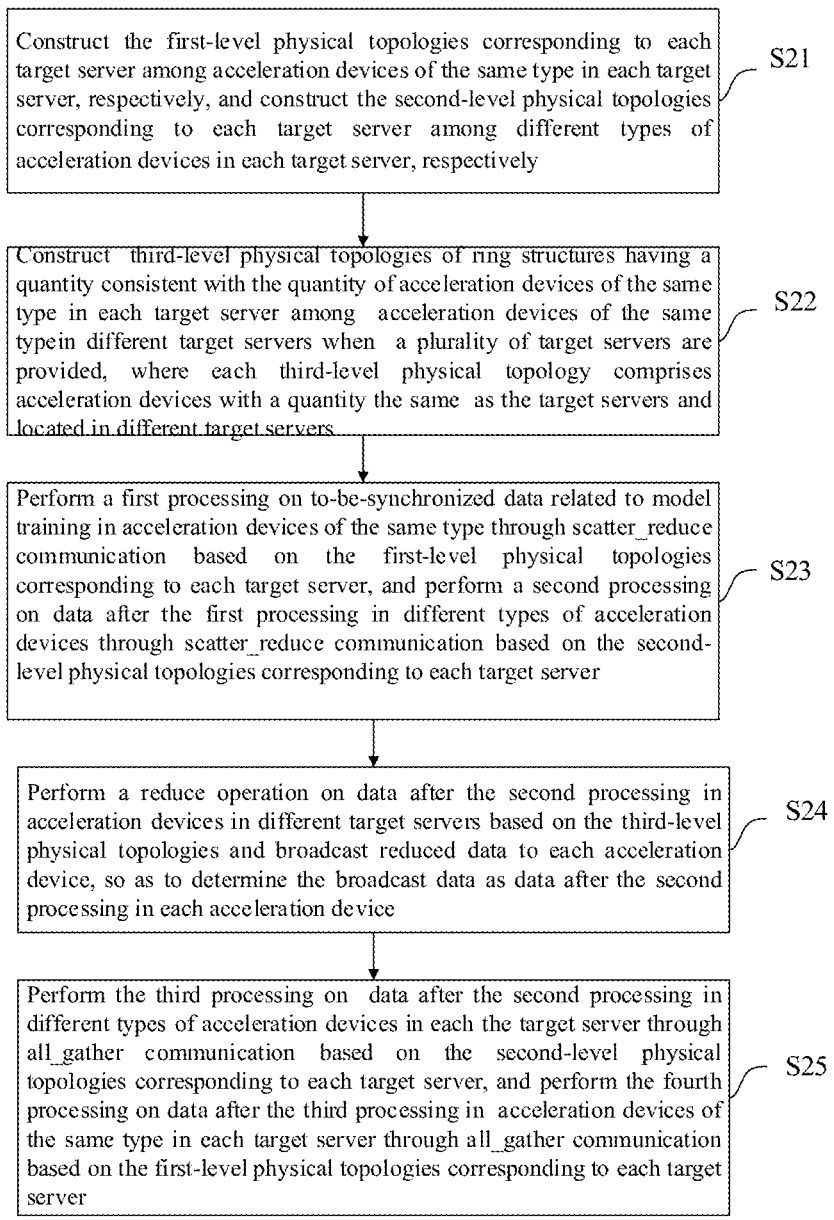
FIG. 2 is a schematic diagram of a data synchronization method provided in the present application.

FIG. 2 is a flowchart of a data synchronization method provided in an embodiment of the present application. As shown in FIG. 2, the data synchronization method includes S21-S25.

In S21, when multiple target servers are provided, first-level physical topologies corresponding to each target server are constructed among acceleration devices of the same type in each target server, respectively, and second-level physical topologies corresponding to each target server is constructed among different types of acceleration devices in each target server, respectively.

Figure 3:
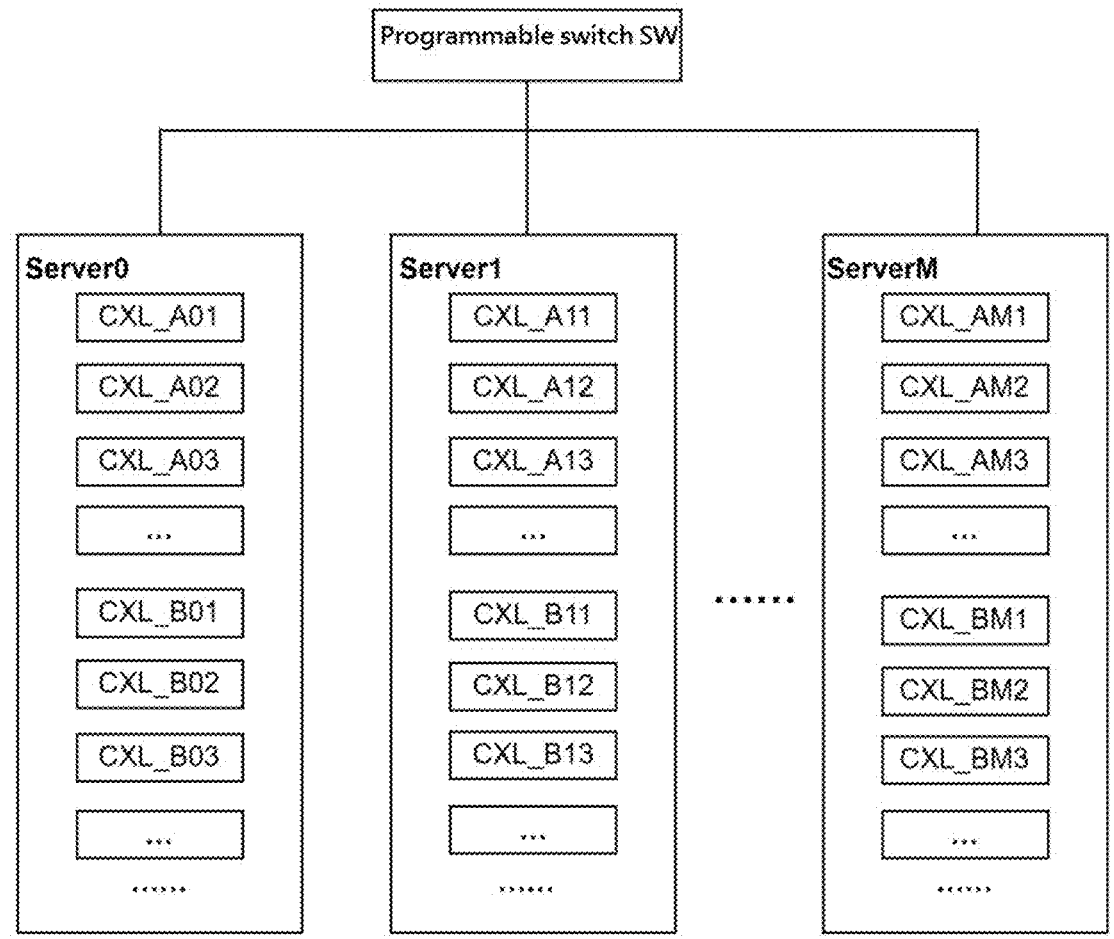
FIG. 3 is a schematic diagram of a CXL heterogeneous device cluster provided in the present application.

In the embodiment, the infrastructure for data synchronization is a server cluster. i.e., there are multiple target servers. Each target server includes the same data and acceleration devices of the same type, so that a server cluster for deep neural network training in which various heterogeneous devices supporting the CXL protocol are deployed is obtained. FIG. 3 is a schematic diagram of a customized CXL device cluster in the embodiment. The cluster is set to include m servers, and CXL devices in each server are evenly distributed. i.e., the quantity of CXL heterogeneous devices in each server is the same, and the quantity of heterogeneous devices in each server node is also the same. For example, if there are n types of P CXL heterogeneous devices in the cluster, these n types of devices are deployed in each server, and the quantity of each type of CXL devices in each server node is P/(mn). Various server nodes are connected to each other through a programmable switch.

Figure 4:
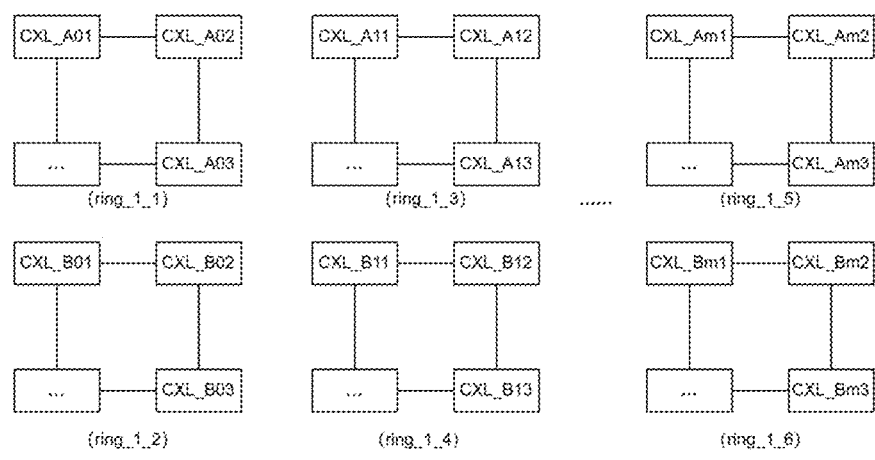
FIG. 4 is a structure diagram of first-level physical topologies provided in the present application.
Figure 5:
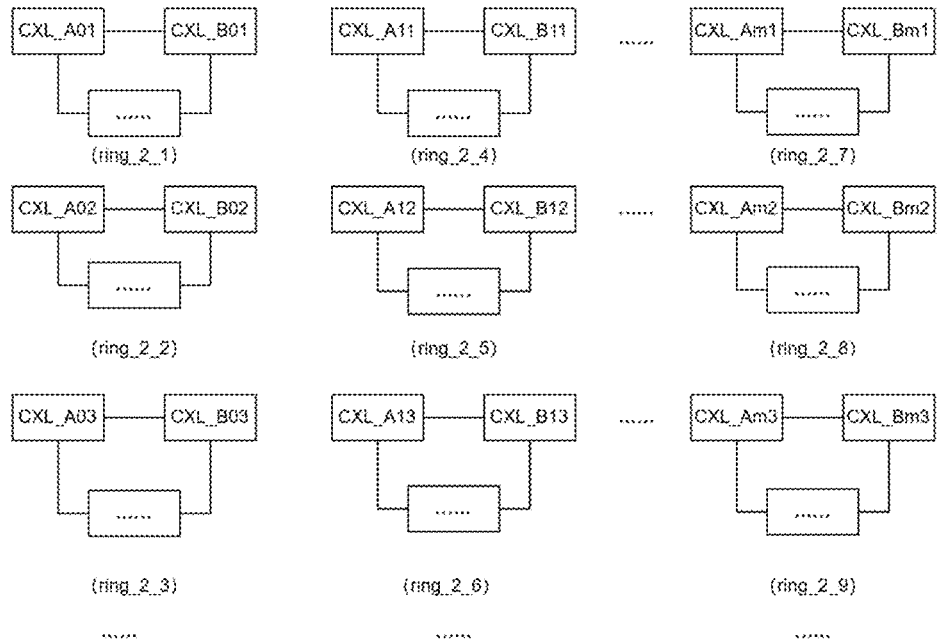
FIG. 5 is a structure diagram of second-level physical topologies provided in the present application.

The first-level physical topologies corresponding to each target server are constructed among acceleration devices of the same type in each target server, respectively, and the second-level physical topologies corresponding to each target server are constructed among different types of acceleration devices in each target server, respectively. It may be understood that the first-level physical topologies include ring_1_1 including {CXL_A01, CXL_A02, CXL_A03 ... }, ring_1_2 including {CXL_B01, CXL_B02, CXL_B03 ... }, etc., as shown in FIG. 4.

In S22, third-level physical topologies of ring structures having a quantity consistent with the quantity of acceleration devices of the same type in each target server among acceleration devices of the same type in different target servers: where each of third-level physical topologies includes acceleration devices with a quantity the same as the target servers and located in different target servers.

Figure 6:
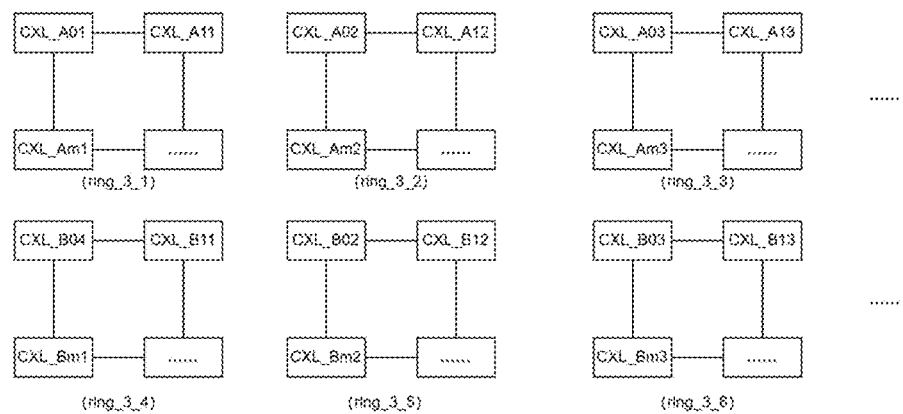
FIG. 6 is a structure diagram of third-level physical topologies provided in the present application.

In the embodiment, since data on acceleration devices in different target servers are also required to participate in synchronization, it is also necessary to construct third-level physical topologies of ring structures having a quantity consistent with the quantity of acceleration devices of the same type in each target server among acceleration devices of the same type in different target servers. Each of third-level physical topologies includes acceleration devices with a quantity the same as the target servers and located in different target servers. Each of third-level physical topologies includes ring_3_1 including {CXL_A01, CXL_A11, . . . , CXL_AM1}, ring_3_2 including {CXL_A02, CXL_A12, ..., CXL_AM2}, ring_3_3 including {CXL_B01. CXL_B11, ..., CXL_BM1}, etc., as shown in FIG. 6.

In S23, a first processing is performed on to-be-synchronized data related to model training in acceleration devices of the same type through scatter_reduce communication based on the first-level physical topologies corresponding to each target server, and a second processing is performed on data after the first processing in different types of acceleration devices through scatter_reduce communication based on the second-level physical topologies corresponding to each target server.

In S24, a reduce operation is performed on data after the second processing in acceleration devices in different target servers based on the third-level physical topologies, and the reduced data is broadcast to each acceleration device, so as to determine the broadcast data as data after the second processing in each acceleration device.

In the embodiment, the same scatter_reduce operation is performed for each target server. Please refer to previously disclosed content for details, which will not be repeated herein. After the first processing, each CXL device in the first-level physical topologies has a partial aggregation result of a data block that is different from any other CXL device in the topologies.

After this, a reduce operation is performed on data after the second processing in the acceleration devices in different target servers based on the third-level physical topologies, and the reduced data is broadcast to each acceleration device to determine the broadcasted data as data after the second processing in each acceleration device. Different target servers are connected through a programmable switch. That is, data after the second processing is received from acceleration devices in different target servers by the programmable switch, a reduce operation is performed on the received data based on the third-level physical topologies, and the reduced data is broadcast to each acceleration device by the programmable switch. Similarly, the acceleration devices corresponding to each of the third-level physical topologies are independent of each other, and the acceleration devices corresponding to different third-level physical topologies perform the reduce operation concurrently.

In S25, a third processing is performed on data after the second processing in different types of acceleration devices in each target server through all_gather communication based on the second-level physical topologies corresponding to each target server, and a fourth processing is performed on data after the third processing in acceleration devices of the same type in each target server through all_gather communication based on the first-level physical topologies corresponding to each target server.

In the embodiment, in the second stage, the third processing is performed on data after the second processing in different types of acceleration devices in each target server through all_gather communication based on the second-level physical topologies corresponding to each target server. i.e., the second-level physical topologies are returned and the all_gather operation is performed. Then, the fourth processing is performed on data after the third processing in acceleration devices of the same type in each target server through all_gather communication base on the first-level physical topologies corresponding to each target server. i.e., the first-level physical topologies are returned and the all_gather operation is performed. Therefore, each acceleration device in the target server has a complete global data aggregation result.

As can be seen, in the embodiments of the present application, a CXL heterogeneous device cluster is firstly defined. i.e., a server cluster for deep neural network training is deployed with various heterogeneous devices supporting the CXL protocol. Then hierarchical physical topologies are constructed based on the described heterogeneous device cluster, and the physical topologies are divided into three levels. Operations are performed at each level to obtain complete Allreduce aggregation results, which solves the Allreduce data aggregation problem in parallel training of synchronous data in the CXL heterogeneous device cluster, and improves the utilization rate of hardware resources in the data center.

Figure 7:
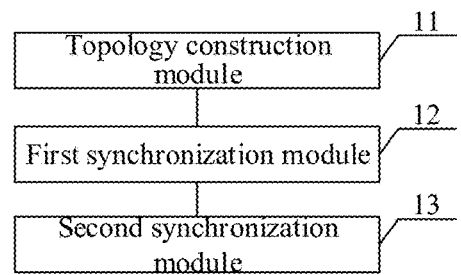
FIG. 7 is a structure schematic diagram of a data synchronization apparatus provided in the present application.

As shown in FIG. 7, an embodiment of the present application further discloses a data synchronization apparatus including:

a topology construction module 11 for constructing first-level physical topologies of ring structures having a quantity consistent with a quantity of types of acceleration devices among acceleration devices of a same type in a target server, and constructing second-level physical topologies of ring structures having a quantity consistent with a quantity of acceleration devices of the same type among different types of acceleration devices in the target server: where different types of acceleration devices supporting cache coherence protocol are provided in the target server, quantities acceleration devices of different types are the same and at least two, and acceleration devices in the second-level physical topologies are connected through the cache coherence protocol:
a first synchronization module 12 for perform a first processing on to-be-synchronized data related to model training in acceleration devices of the same type through scatter_reduce communication based on the first-level physical topologies, and perform a second processing on data after the first processing in different types of acceleration devices through scatter_reduce communication based on the second-level physical topologies; and
a second synchronization module 13 for performing a third processing on data after the second processing in different types of acceleration devices through all_gather communication based on the second-level physical topologies, and performing a fourth processing on data after the third processing in acceleration devices of the same type through all_gather communication based on the first-level physical topologies.

As can be seen, in the embodiments of the present application, first-level physical topologies of ring structures having a quantity consistent with the quantity of types of acceleration devices are constructed among acceleration devices of the same type in the target server, and then second-level physical topologies of ring structures having a quantity consistent with the quantity of acceleration devices of the same type are constructed among different types of acceleration devices. Different types of acceleration devices supporting the cache coherence protocol are provided in the target server. Quantities of different types of acceleration devices are the same and at least two. Acceleration devices in the second-level physical topologies are connected through the cache coherence protocol. The first processing is performed on the to-be-synchronized data in acceleration devices of the same type through scatter_reduce communication based on the first-level physical topologies. The second processing is performed on data after the first processing in different types of acceleration devices through scatter_reduce communication based on the second-level physical topologies. Finally, the third processing is performed on data after the second processing in different types of acceleration devices through all_gather communication based on the second-level physical topologies, and the fourth processing is performed on data after the third processing in acceleration devices of the same type through all_gather communication based on the first-level physical topologies. In the embodiments of the present application, the physical topologies are constructed based on the cache coherence protocol connection among different types of acceleration devices, and scatter_reduce communication and all_gather communication are performed based on the physical topologies constructed among acceleration devices of the same type. Data of different types of acceleration devices. i.e., heterogeneous acceleration devices, may be synchronized and deep learning data parallelism is achieved based on multiple heterogeneous acceleration devices. The utilization of hardware resources is improved, and the data communication during the parallel training of deep learning synchronous data is more efficient.

In some embodiments, when there are multiple target servers, the data synchronization apparatus further includes:
a cluster topology construction module for constructing third-level physical topologies of ring structures having a quantity consistent with the quantity of acceleration devices of the same type in each target server among acceleration devices of the same type in different target servers, where each of third-level physical topologies includes acceleration devices with the quantity the same as the target servers and located in different target servers; and
a reduce and broadcast module for performing a reduce operation on data after the second processing in acceleration devices in different target servers based on the third-level physical topologies and broadcasting the reduced data to each acceleration device, so as to determine the reduced data as data after the second processing in each acceleration device.

In some embodiments, the data synchronization apparatus further includes:
a determination module for determining whether a bandwidth of data transmission between acceleration devices of the same type through other available connections is higher than a bandwidth of data transmission through the cache coherence protocol connection. If the bandwidth of data transmission between acceleration devices of the same type through other available connections is higher than the bandwidth of data transmission through the cache coherence protocol connection, physical topologies are constructed among acceleration devices of the same type through other available connections.

Figure 8:
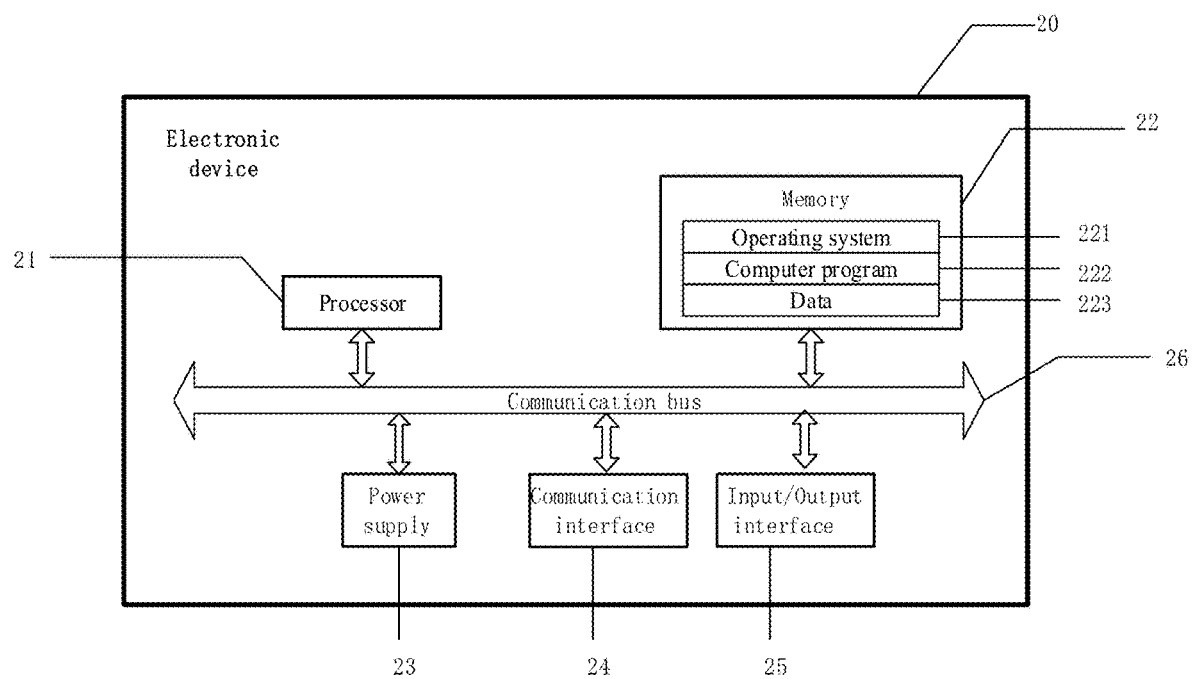
FIG. 8 is a structure diagram of a data synchronization electronic device provided in the present application.

Further, an embodiment of the present application provides an electronic device. FIG. 8 is a structure schematic diagram of an electronic device 20 according to an exemplary embodiment. The content in FIG. 8 may not be considered as any limitation on the scope of use of the present application.

FIG. 8 is a structure schematic diagram of the electronic device 20 provided in the embodiment of the present application. The electronic device 20 may include at least one processor 21, at least one memory 22, a power supply 23, a communication interface 24, an input/output interface 25 and a communication bus 26. The memory 22 is configured to store a computer program, and the computer program is loaded and executed by the processor 21 to implement relevant steps in the above data synchronization method.

In the embodiment, the power supply 23 is configured to provide operating voltage for various hardware devices on the electronic device 20. The communication interface 24 may create a data transmission channel between the electronic device 20 and an external device, and the communication protocol it follows is any communication protocol that may be applied to the technical solution of the present application, and is not limited herein. The input/output interface 25 is configured to obtain input data from the outside or to output data to the outside, and its interface type may be selected according to the application needs, and is not limited herein.

In addition, the memory 22 as a carrier for resource storage may be read-only memory, random access memory, disk or optical disk, etc. The resources stored thereon may include an operating system 221, a computer program 222 and data 223, etc. The storage method may be temporary storage or permanent storage.

The operating system 221 is configured to manage and control various hardware devices and the computer program 222 on the electronic device 20 to achieve the operation and processing of massive data 223 in the memory 22 by the processor 21, and may be Windows Server. Netware. Unix, Linux, etc. The computer program 222 may further include a computer program which may be used to perform other tasks, in addition to a computer program which may be used to perform the above data synchronization method performed by the electronic device 20. The data 223 may include topology data collected by the electronic device 20.

Further, an embodiment of the present application further discloses a non-transitory computer-readable storage medium, in which a computer program is stored. The computer program, when loaded and executed by the processor, implements steps of the above data synchronization method.

Each embodiment in this specification is described in a progressive manner, each embodiment focuses on the difference from other embodiments, and the same and similar parts of each embodiment may be referred to each other. For the apparatus disclosed in the embodiments, as it corresponds to the method disclosed in the embodiments, the description is relatively simple. Please refer to the method section for relevant information.

It should also be noted that relational terms herein such as first and second, etc., are used merely to distinguish one entity or operation from another entity or operation, and do not necessarily require or imply there is any such relationship or order between these entities or operations. Furthermore, the terms "including". "comprising" or any variations thereof are intended to embrace a non-exclusive inclusion, such that a process, method, article, or terminal device including a plurality of elements includes not only those elements but also includes other elements not expressly listed, or also includes elements inherent to such a process, method, article, or device. In the absence of further limitation, an element defined by the phrase "including a . . . " does not exclude the presence of additional identical element in the process, method, article, or terminal device.

The data synchronization method, apparatus, device, and storage medium provided in the present application are described in detail above. Examples are applied to explain the principle and implementation of the present application herein. The above embodiments are only used to help understand the method of the present application and the core idea thereof. Meanwhile, for those of ordinary skills in the art, there may be changes in the implementation and application scope according to the idea of the present application. To sum up, the contents of this specification should not be construed as limiting the present application.

The invention claimed is:

1. A data synchronization method, comprising:
constructing first level physical topologies of ring structures having a quantity consistent with a quantity of types of acceleration devices among acceleration devices of a same type in a target server, and constructing second level physical topologies of ring structures having a quantity consistent with a quantity of acceleration devices of the same type among different types of acceleration devices in the target server, wherein different types of acceleration devices supporting cache coherence protocol are provided in the target server, quantities of acceleration devices of different types are the same and at least two, and acceleration devices in the second level physical topologies are connected through the cache coherence protocol;
performing a first processing on to be synchronized data related to model training in acceleration devices of the same type through scatter reduce communication based on the first level physical topologies, and performing a second processing on data after the first processing in different types of acceleration devices through scatter reduce communication based on the second level physical topologies; and
performing a third processing on data after the second processing in different types of acceleration devices through all gather communication based on the second level physical topologies, and performing a fourth processing on data after the third processing in acceleration devices of the same type through all gather communication based on the first level physical topologies;
wherein a physical connection between different types of acceleration devices comprises a connection using central processing unit (CPU) as an intermediate medium and a connection using the cache coherence protocol; and
before the constructing the first level physical topologies of ring structures having the quantity consistent with the quantity of types of acceleration devices among acceleration devices of the same type in the target server, and constructing the second level physical topologies of ring structures having the quantity consistent with the quantity of acceleration devices of the same type among different types of acceleration devices in the target server, the method further comprises:
determining whether a bandwidth of data transmission between different types of acceleration devices through the connection using CPU as the intermediate medium is higher than a bandwidth of data transmission between different types of acceleration devices through the connection using the cache coherence protocol; and
using the connection using the cache coherence protocol as the physical connection between different types of acceleration devices when the bandwidth of data transmission between different types of acceleration devices through the connection using CPU as the intermediate medium is higher than the bandwidth of data transmission between different types of acceleration devices through the connection using the cache coherence protocol.

2. The data synchronization method according to claim 1, wherein acceleration devices corresponding to each of the first level physical topologies are independent of each other, and acceleration devices corresponding to different first level physical topologies perform concurrently when the first processing and the fourth processing are performed;
acceleration devices corresponding to each of the second level physical topologies are independent of each other, and acceleration devices corresponding to different second level physical topologies perform concurrently when the second processing and the third processing are performed.

3. The data synchronization method according to claim 1, wherein before the constructing the first level physical topologies of ring structures having the quantity consistent with the quantity of types of acceleration devices among acceleration devices of the same type in the target server, and constructing the second level physical topologies of ring structures having the quantity consistent with the quantity of acceleration devices of the same type among different types of acceleration devices in the target server, the method further comprises:
setting the acceleration devices of different types with the quantity being the same and at least two in the target server, and connecting the acceleration devices of different types using the cache coherence protocol.

4. The data synchronization method according to claim 3, wherein the setting the acceleration devices of different types with the quantity being the same and at least two in the target server, and connecting the acceleration devices of different types using the cache coherence protocol, comprises:

setting at least two graphics processing unit (GPU) devices and setting field programmable gate array (FPGA) devices with a quantity the same as the GPU devices in the target server, and connecting the GPU devices and the FPGA devices using the cache coherence protocol.

5. The data synchronization method according to claim 3, wherein the setting the acceleration devices of different types with the quantity being the same and at least two in the target server, and connecting the acceleration devices of different types using the cache coherence protocol, comprises:

acquiring one acceleration device from different types of acceleration devices in the target server in sequence, and connecting a next acquired acceleration device to a last acquired acceleration device using the cache coherence protocol.

6. The data synchronization method according to claim 1, wherein the performing the first processing on the to be synchronized data related to model training in acceleration devices of the same type through scatter reduce communication based on the first level physical topologies comprises:

performing the first processing on to be synchronized data related to model training in each acceleration device in the first level physical topologies through scatter reduce communication, to obtain at least one partial aggregation result of the to be synchronized data related to the model training, wherein the partial aggregation result in each acceleration device is different from partial aggregation results in other acceleration devices in the first level physical topologies.

7. The data synchronization method according to claim 1, wherein the method further comprises:

performing the first processing on to be synchronized data related to model training in acceleration devices of the same type in each target server through scatter reduce communication based on the first level physical topologies corresponding to each target server when a plurality of target servers are provided.

8. The data synchronization method according to claim 1, wherein the method further comprises:

constructing third level physical topologies of ring structures having a quantity consistent with the quantity of the acceleration devices of the same type in each target server among the acceleration devices of the same type in different target servers when a plurality of target servers are provided, wherein each of third level physical topologies comprises acceleration devices with a quantity the same as the target servers and located in different target servers; and after performing the second processing on data after the first processing in different types of acceleration devices through scatter reduce communication based on the second level physical topologies, the method further comprises:

performing a reduce operation on data after the second processing in acceleration devices in different target servers based on the third level physical topologies and broadcasting reduced data to each acceleration device, so as to determine the broadcast data as data after the second processing in each acceleration device.

9. The data synchronization method according to claim 8, wherein the performing the reduce operation on data after the second processing in acceleration devices in different target servers based on the third level physical topologies and broadcasting the reduced data to each acceleration device, comprises:

receiving data after the second processing in the acceleration devices in different target servers by using a programmable switch, performing a reduce operation on received data based on the third level physical topologies, and broadcasting the reduced data to each acceleration device by using the programmable switch, wherein each target server is connected to a programmable switch.

10. The data synchronization method according to claim 8, wherein the constructing the first level physical topologies of ring structures having the quantity consistent with the quantity of types of acceleration devices among acceleration devices of the same type in the target server, and constructing the second level physical topologies of ring structures having a quantity consistent with the quantity of acceleration devices of the same type among different types of acceleration devices in the target server, comprises:

constructing the first level physical topologies corresponding to each target server among the acceleration devices of the same type in each target server, and constructing the second level physical topologies corresponding to each target server among the acceleration devices of different types in each target server; and the performing the third processing on data after the second processing in different types of acceleration devices through all gather communication based on the second level physical topologies, and performing the fourth processing on data after the third processing in acceleration devices of the same type through all gather communication based on the first level physical topologies, comprises:

performing the third processing on data after the second processing in different types of acceleration devices in each target server through all gather communication based on the second level physical topologies corresponding to each target server, and performing the fourth processing on data after the third processing in acceleration devices of the same type in each target server through all gather communication based on the first level physical topologies corresponding to each target server.

11. The data synchronization method according to claim 8, wherein acceleration devices corresponding to each of the third level physical topologies are independent of each other, and acceleration devices corresponding to different third level physical topologies perform concurrently when the reduce operation is performed.

12. The data synchronization method according to claim 1, wherein before the constructing the first level physical topologies of ring structures having the quantity consistent with the quantity of types of acceleration devices among acceleration devices of the same type in the target server, the method further comprises:

determining whether a bandwidth of data transmission between acceleration devices of the same type through other available connection is higher than a bandwidth of data transmission through the connection using the cache coherence protocol; and constructing physical topologies among the acceleration devices of the same type through the other available connection when the bandwidth of data transmission between the acceleration devices of the same type through the other available connection is higher than the bandwidth of data transmission through the connection using the cache coherence protocol.

13. The data synchronization method according to claim 12, wherein the other available connection comprises an original connection; and
   determining whether the bandwidth of data transmission between acceleration devices of the same type through the other available connection is higher than the bandwidth of data transmission through the connection using the cache coherence protocol; and
   constructing physical topologies among the acceleration devices of the same type through the other available connection when the bandwidth of data transmission between the acceleration devices of the same type through the other available connection is higher than the bandwidth of data transmission through the connection using the cache coherence protocol, comprises:
   determining whether a bandwidth of data transmission between acceleration devices of the same type through the original connection is higher than the bandwidth of data transmission through the connection using the cache coherence protocol; and
   connecting the acceleration devices of the same type in pairs through the original connection when the bandwidth of data transmission between the acceleration devices of the same type through the original connection is higher than the bandwidth of data transmission through the connection using the cache coherence protocol.

14. The data synchronization method according to claim 13, wherein the original connection comprises NVLink (NVIDIA Link, a bus and its communication protocol developed and introduced by NVIDIA); and
   the determining whether the bandwidth of data transmission between acceleration devices of the same type through the original connection is higher than the bandwidth of data transmission through the connection using the cache coherence protocol, and connecting the acceleration devices of the same type in pairs through the original connection when the bandwidth of data transmission between acceleration devices of the same type through the original connection is higher than the bandwidth of data transmission through the connection using the cache coherence protocol, comprises:
   determining whether a bandwidth of data transmission between acceleration devices of the same type through NVLink is higher than the bandwidth of data transmission through the connection using the cache coherence protocol; and
   connecting the acceleration devices of the same type in pairs through NVLink when the bandwidth of data transmission between acceleration devices of the same type through NVLink is higher than the bandwidth of data transmission through the connection using the cache coherence protocol.

15. A data synchronization system, wherein the data synchronization system comprises a server cluster, servers in the server cluster comprise different types of acceleration devices supporting compute express link (CXL) protocol, the different types of acceleration devices are configured for deep neural network training; and
   the data synchronization system is configured for constructing first level physical topologies of ring structures having a quantity consistent with a quantity of types of acceleration devices among acceleration devices of a same type in a target server, and constructing second level physical topologies of ring structures having a quantity consistent with a quantity of acceleration devices of the same type among different types of acceleration devices in the target server, wherein different types of acceleration devices supporting cache coherence protocol are provided in the target server, quantities of acceleration devices of different types are the same and at least two, and the acceleration devices in the second level physical topologies are connected through the cache coherence protocol;
   performing a first processing on to be synchronized data related to model training in acceleration devices of the same type through scatter reduce communication based on the first level physical topologies, and performing a second processing on data after the first processing in different types of acceleration devices through scatter reduce communication based on the second level physical topologies; and
   performing a third processing on data after the second processing in different types of acceleration devices through all gather communication based on the second level physical topologies, and performing a fourth processing on data after the third processing in the acceleration devices of the same type through all gather communication based on the first level physical topologies;
   wherein a physical connection between different types of acceleration devices comprises a connection using central processing unit (CPU) as an intermediate medium and a connection using the cache coherence protocol; and
   before the constructing the first level physical topologies of ring structures having the quantity consistent with the quantity of types of acceleration devices among acceleration devices of the same type in the target server, and constructing the second level physical topologies of ring structures having the quantity consistent with the quantity of acceleration devices of the same type among different types of acceleration devices in the target server, the method further comprises:
   determining whether a bandwidth of data transmission between different types of acceleration devices through the connection using CPU as the intermediate medium is higher than a bandwidth of data transmission between different types of acceleration devices through the connection using the cache coherence protocol; and
   using the connection using the cache coherence protocol as the physical connection between different types of acceleration devices when the bandwidth of data transmission between different types of acceleration devices through the connection using CPU as the intermediate medium is higher than the bandwidth of data transmission between different types of acceleration devices through the connection using the cache coherence protocol.

16. A non-transitory computer-readable storage medium, for storing a computer executable instruction, wherein the computer executable instruction, when loaded and executed by a processor, implements a data synchronization method according to claim 1 comprising:
   constructing first level physical topologies of ring structures having a quantity consistent with a quantity of types of acceleration devices among acceleration devices of a same type in a target server, and constructing second level physical topologies of ring structures having a quantity consistent with a quantity of acceleration devices of the same type among different types of acceleration devices in the target server, wherein different types of acceleration devices supporting cache coherence protocol are provided in the target server, quantities of acceleration devices of different types are the same and at least two, and acceleration devices in the second level physical topologies are connected through the cache coherence protocol;

performing a first processing on to be synchronized data related to model training in acceleration devices of the same type through scatter reduce communication based on the first level physical topologies, and performing a second processing on data after the first processing in different types of acceleration devices through scatter reduce communication based on the second level physical topologies; and performing a third processing on data after the second processing in different types of acceleration devices through all gather communication based on the second level physical topologies, and performing a fourth processing on data after the third processing in acceleration devices of the same type through all gather communication based on the first level physical topologies;

wherein a physical connection between different types of acceleration devices comprises a connection using central processing unit (CPU) as an intermediate medium and a connection using the cache coherence protocol; and before the constructing the first level physical topologies of ring structures having the quantity consistent with the quantity of types of acceleration devices among acceleration devices of the same type in the target server, and constructing the second level physical topologies of ring structures having the quantity consistent with the quantity of acceleration devices of the same type among different types of acceleration devices in the target server, the method further comprises:

determining whether a bandwidth of data transmission between different types of acceleration devices through the connection using CPU as the intermediate medium is higher than a bandwidth of data transmission between different types of acceleration devices through the connection using the cache coherence protocol; and using the connection using the cache coherence protocol as the physical connection between different types of acceleration devices when the bandwidth of data transmission between different types of acceleration devices through the connection using CPU as the intermediate medium is higher than the bandwidth of data transmission between different types of acceleration devices through the connection using the cache coherence protocol.

* * * * *